UNITED STATES PATENT OFFICE.

FRIEDRICH KRÜGER, OF MÜHLHEIM, NEAR FRANKFORT-ON-THE-MAIN, GERMANY, ASSIGNOR TO A. LEONHARDT & CO., OF SAME PLACE.

MEDICAL COMPOUND.

SPECIFICATION forming part of Letters Patent No. 401,500, dated April 16, 1889.

Application filed November 9, 1888. Serial No. 290,378. (No specimens.)

*To all whom it may concern:*

Be it known that I, FRIEDRICH KRÜGER, a subject of the Emperor of Germany, residing at Mühlheim, near Frankfort-on-the-Main, Germany, have invented new and useful Improvements in Medical Matter, of which the following is a specification.

Through E. Baumann (*Berichte der Deutschen Chemischen Gesellschaft*, 1885, 884 ff.) it has become known that mercaptols can be produced by the action of mercaptan on aldehydes, among others the ethylmercaptol of the benzaldehyde, $C_6H_5CH(SC_2H_5)_2$, which he describes as a liquid which is decomposed by being heated to the degree at which it vaporizes. I have discovered that this ethylmercaptol of the benzaldehyde is transformed by oxidation into the disulphonate $C_6H_5CH(SO_2C_2H_5)_2$. As means of oxidation I employ permanganate of potassium.

This disulphonate is to be used in medicine as a substitute for morphine for producing sleep. It is almost insoluble in cold water and dissolves hardly in hot water. It is without smell, and has a slightly bitter taste. It crystallizes out of water in thin long white needles, which melt at 133° Celsius, (uncorrected atmospheric pressure.) It is soluble without decomposing in hot acids and alkalies, and on cooling it crystallizes out unchanged. Permanganate of potassium has no effect upon it.

Having thus described my invention and the manner of employing the same, what I claim, and wish to have secured to me by Letters Patent of the United States of America, is—

The medical compound herein described, having the formula $C_6H_5CH(SO_2C_2H_5)_2$, and having the properties of being almost insoluble in cold water, hardly soluble in hot water, being without smell, having a slight bitter taste, crystallizing in thin long white needles, melting at 133° Celsius, (uncorrected,) being soluble without decomposing in hot acids and alkalies, and being not acted upon by permanganate of potassium.

In testimony whereof I have signed my name to this specification in the presence of two subscribing witnesses.

FRIEDRICH KRÜGER.

Witnesses:
   JOSEPH PATRICK,
   ALVESTO P. HOGUE.